July 28, 1959   M. ROMAN   2,896,787
VACUUM MILK FILTER
Filed April 15, 1958

INVENTOR
Michael Roman

United States Patent Office 2,896,787
Patented July 28, 1959

2,896,787
VACUUM MILK FILTER
Michael Roman, Lowville, N.Y.
Application April 15, 1958, Serial No. 728,616
5 Claims. (Cl. 210—406)

My invention relates to an improved apparatus for filtering milk by use of vacuum and more especially in sediment testing of previously filtered milk supplies such as milk in bulk cooling tanks on farms, milk in large storage tanks, cheese vats and the like. It meets the need for an apparatus of this nature for sediment testing of relatively large quantity samples of stirred milk representing the lot of milk being tested.

The degree of cleanliness of bulk milk supplies is commonly referred to in terms of milligrams of sediment found present in a predetermined volume of milk when filtered through sediment test material of a predetermined area, for example, the filtering of a one gallon sample of stirred milk through a sediment test disc having a test area diameter of 1⅛ inches. The milligrams of sediment found by the test is determined by comparing the resulting sediment test disc of the milk sample with photographed or specially prepared sediment test standard discs known to contain weighed amounts of sediment. My invention meets the need for an apparatus for this type of sediment testing.

My invention is adapted for use by milk producers and other who possess a source of vacuum. It makes possible for producers to sediment test their own milk before offering it for sale to determine its degree of cleanliness and thereby avoid rejections, loss of market or other punitive actions which otherwise they might suffer should their milk be found below the acceptable standard of cleanliness. Likewise, the invention is valuable to purchasers of milk and to those regulatory agencies engaged in milk inspection to easily ascertain the degree of cleanliness of milk supplies, and such ease of testing should tend to benefit consumers by virtue of cleaner milk supplies and dairy products made from the milk.

Another object of my invention is to provide for a plurality of individual sediment test results in a single testing operation of a milk supply whereby an individual test disc may be made available for a number of interested parties such as the producer, purchaser or regulatory agency.

Another very important object of this invention is to provide an assembly so that discs of milk sediment testing material specially made for and used in pressure filtration are so supported and held in the apparatus as to make possible the use of an unobstructed filtering area on the testing disc over which area the extraneous material filtered from the milk sample is relatively uniformly distributed and thereby easily compared and graded with commonly used milk sediment standards which were prepared on unobstructed and design-free test discs. The use of perforated or screened support under the testing area of the filtering material is therefore purposely avoided in my invention since the design of the underlying support left on the filtering surface of the test disc would interfere with proper grading with sediment test standards like the aforementioned.

The foregoing and other features of my invention will now be described in connection with the accompanying drawings forming a part of this specification in which I have illustrated my invention in its preferred form, after which I shall point out in the claims those features which I believe to be new and of my own invention.

Figure 1:
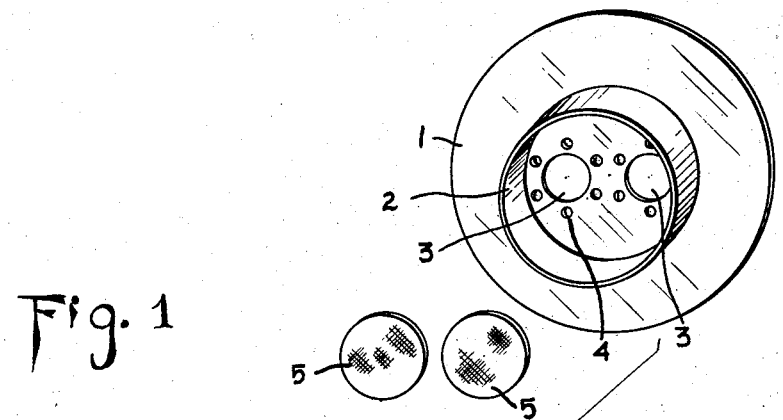
Figure 1 is an extended or blown up view of my vacuum filter showing the relation of the assembled parts in perspective.
Figure 2:
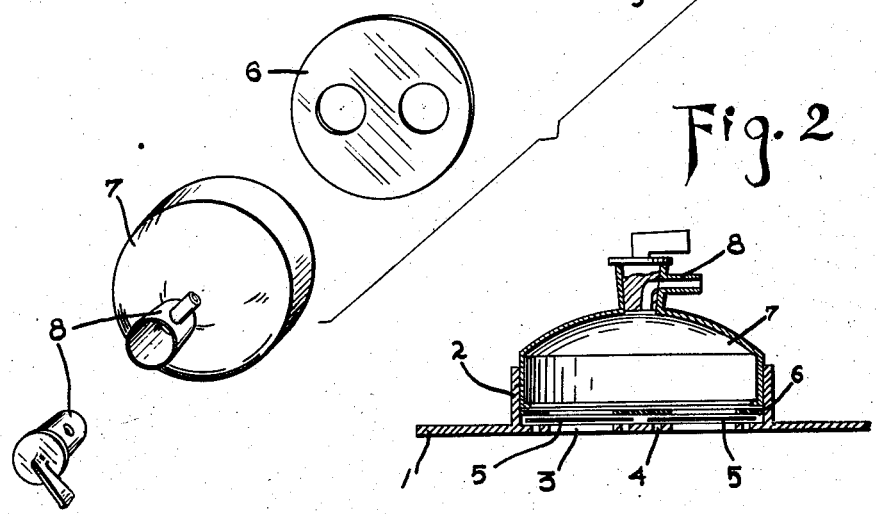
Figure 2 is a sectional view of th evacuum filter showing the parts illustrated in Figure 1 in assembled position.

In carrying out my invention, I employ a gasketed circular cover 1 which embodies a permanently built well thereon by means of a vertical casing 2 and the floor of the well is provided with a plurality of open filtering areas 3 which are surrounded by adjacent sealing holes 4. Filtering discs 5 larger in size than the open filtering and adjacent sealing holes bridge across each of the open filtering areas and the adjacent sealing holes. A removable rubber shield 6 substantially covering the entire area of the floor in the well overlays the filtering material and the shield is provided with open areas positioned to approximately correspond in size, shape and location to the open filtering areas of the well floor, the said rubber shield thereby gaskets that portion of the filtering material over the sealing holes and leaves open for filtering only that portion of the material which bridges the open filtering area of the well floor. A closure dome 7 with an inwardly and vertically flanged rim and slightly smaller in circumference than the well casing telescopes into the well resting on the edge of the rubber shield covering the well floor. The closure dome is provided with a milk control valve 8 at its apex to which is connected a milk delivery tube 9.

Figure 3:
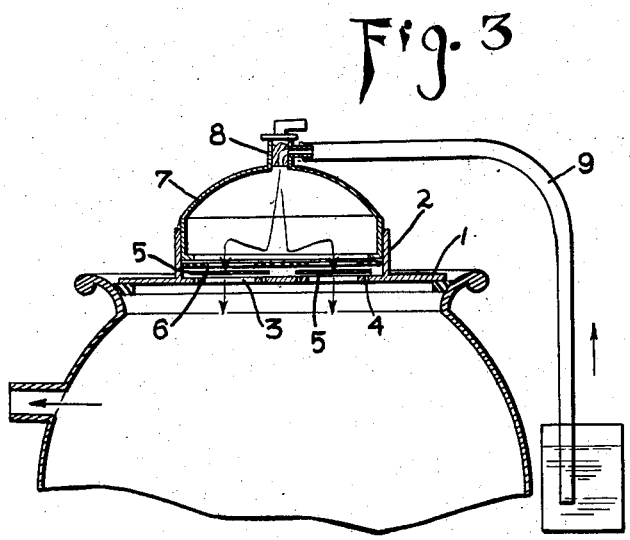
Figure 3 is a diagrammatic assembly of the filter in operating position.

The assembly which I preferably employ is illustrated diagrammatically in Figure 3 and shows the vacuum filter vacuumed to a container to receive the filtrate and a container with milk to be filtered.

When a vacuum is created in the container to receive the filtered milk and valve 8 is opened, the predetermined quantity of milk is immediately sucked up the delivery tube and into the vacuum filter, through the filtering material secured and held over the several filtering areas which provide the sediment test of the milk.

It can be readily seen that if a lesser number of sediment tests are desired than the number of filtering areas provided in the well floor, then a rubber shield with a lesser number of openings would be used in the filter. The unused open filtering areas in the well floor would then be covered by a solid portion of the rubber shield. Also, it can be readily seen that if milk sediment test results obtained are to be graded with milk sediment standards prescribed for definite quantities of milk and a testing area of a specific size, then the size of the open milk filtering areas in the well floor should conform to the size prescribed in the standards used and likewise the predetermined quantity of milk to be filtered should be proportionate to the number of open milk filtering areas used in the apparatus in the testing process.

I also wish to point out that the sealing holes 4 serve a very important function together with rubber shield 6 for when vacuum is applied to the vacuum filter, the sealing holes make possible vacuum action on the rubber shield causing it to be tightly vacuumed to that portion of the filtering material covered by the shield, and combined with the suction on the filtering material overlaying the sealing holes, this pressure securely holds the filtering material in place over the open filtering area. The inwardly formed vertical flange on the rim of closure dome 7 resting on the outer edge of the rubber shield adds to rigid support of the shield when the apparatus is subjected to vacuum. No by-pass of milk without filtration will occur when filtering material is secured over the open filtering area in such described manner.

It is also pointed out that the use of an open filtering area in the central portion of the well floor is avoided, thereby that portion of the well floor is covered with a solid portion of the rubber shield. The incoming milk to be filtered does not hit with direct force on a testing area but rather is dispersed outwardly from the center to the open filtering areas. This eliminates the use of a separate milk deflecting plate.

I wish it distinctly understood that the vacuum filter herein illustrated and described is in the form in which I desire to construct it and that changes or variations may be made as may be convenient or desirable without departing from the salient features of my invention, and I therefore intend the following claims to cover such modification as naturally fall within the lines of invention.

I claim:

1. Apparatus for filtering milk for sediment testing, comprising a plate having a relatively large unobstructed aperture therein the marginal edge of which defines an unobstructed test area, said plate having a row of relatively small ports disposed around the marginal edge of said aperture, said ports being adjacent to and spaced from said marginal edge, a filter disc disposed in overlying relation over said aperture and all of said ports, and having a central filter area defined by the marginal edge of said plate aperture, and a surrounding supporting area overlying said ports, an impervious flexible sealing gasket overlying said filter disc and having an aperture corresponding to and in alignment with said plate aperture, and means for establishing a pressure differential on opposite sides of said plate, to secure said gasket and clamp the surrounding area of said filter disc over and around the ports in said plate, and to cause the flow of milk through the filter area of said filter disc, from the gasket side thereof to the plate side thereof.

2. Apparatus for filtering milk for sediment testing, comprising a vacuum vessel having an opening to receive a cover, a cover plate disposed in and sealing said opening and having a relatively large unobstructed aperture therein the marginal edge of which defines an unobstructed test area, said plate having a row of relatively small ports disposed around the marginal edge of said aperture, said ports being adjacent to and spaced from said marginal edge, a filter disc overlying said aperture and all of said ports, and having a central filter area defined by the marginal edge of said plate aperture, and a surrounding supporting area overlying said ports, an impervious flexible sealing gasket overlying said filter disc and having an aperture corresponding to and in alignment with said plate aperture, to clamp the surrounding area of said disc upon said plate, an upstanding flange on said plate extending around said gasket and filter disc, and a closure dome having a milk intake in a wall thereof telescopically disposed in relation to said flange and having a lower rim adapted to engage in sealing relation with said gasket.

3. Apparatus for filtering milk for sediment testing, comprising a vacuum vessel having an opening to receive a cover, a cover plate disposed in and sealing said opening and having a relatively large unobstructed aperture therein the marginal edge of which defines an unobstructed test area, said plate having a row of relatively small ports disposed around the marginal edge of said aperture, said ports being adjacent to and spaced from said marginal edge, a filter disc overlying said aperture and all of said ports, and having a central filter area defined by the marginal edge of said plate aperture, and a surrounding supporting area overlying said ports, an impervious flexible sealing gasket overlying said filter disc and having an aperture corresponding to and in alignment with said plate aperture to clamp the surrounding area of said disc upon said plate, and a closure dome for said cover having a lower rim engaging said gasket in sealing relation with the upper surface thereof and surrounding said aperture, said dome having a milk intake conduit in the wall thereof.

4. Apparatus for filtering milk for sediment testing, comprising a plate having at least two relatively large spaced unobstructed like circular apertures therein the marginal edge of each of which define unobstructed circular test areas, said plate having a circular row of relatively small ports disposed around the marginal edge of each of said apertures, said ports being adjacent to and spaced from the marginal edges of said apertures, a filter disc disposed in overlying relation over each of said apertures and the respective circular row of ports associated with said aperture, and each disc having a central filter area defined by the marginal edge of said plate aperture, and a surrounding supporting area overlying the respective row of ports, an impervious flexible sealing gasket overlying said filter discs and having apertures corresponding to and in alignment with said plate apertures, suction means below said plate to secure said gasket and clamp the surrounding areas of said filter discs over and around the respective circular rows of ports in said plate, and to cause the flow of milk through said filter area, from the gasket side thereof to the plate side thereof, and a dome having a milk intake in the wall thereof, seated on said gasket and overlying said apertures.

5. Apparatus for filtering milk for sediment testing, comprising a vacuum vessel having an opening to receive a cover, a cover plate having at least two relatively large spaced unobstructed like circular apertures therein, the marginal edges of each of which define unobstructed circular test areas, said plate having a circular row of relatively small ports disposed around the marginal edge of each of said apertures, said ports being adjacent to and spaced from the marginal edges of their respective apertures, a filter disc overlying each of said apertures and their respective row of ports and each disc having a central filter area defined by the marginal edge of said plate aperture, and a surrounding supporting area overlying the respective row of ports, an impervious flexible sealing gasket overlying said filter discs and having apertures corresponding to and in alignment with said plate apertures to clamp the surrounding area of each of said discs upon said plate, an upstanding flange on said plate surrounding said apertures and ports, and a dome having a milk inlet conduit centered by said flange and having a rim having sealing engagement with said gasket, and extending around the area of said gasket having said apertures.

References Cited in the file of this patent

UNITED STATES PATENTS

| | | |
|---|---|---|
| 1,472,896 | Alsop | Nov. 6, 1923 |
| 2,516,102 | Brant | July 25, 1950 |